United States Patent Office
3,118,179
Patented Jan. 21, 1964

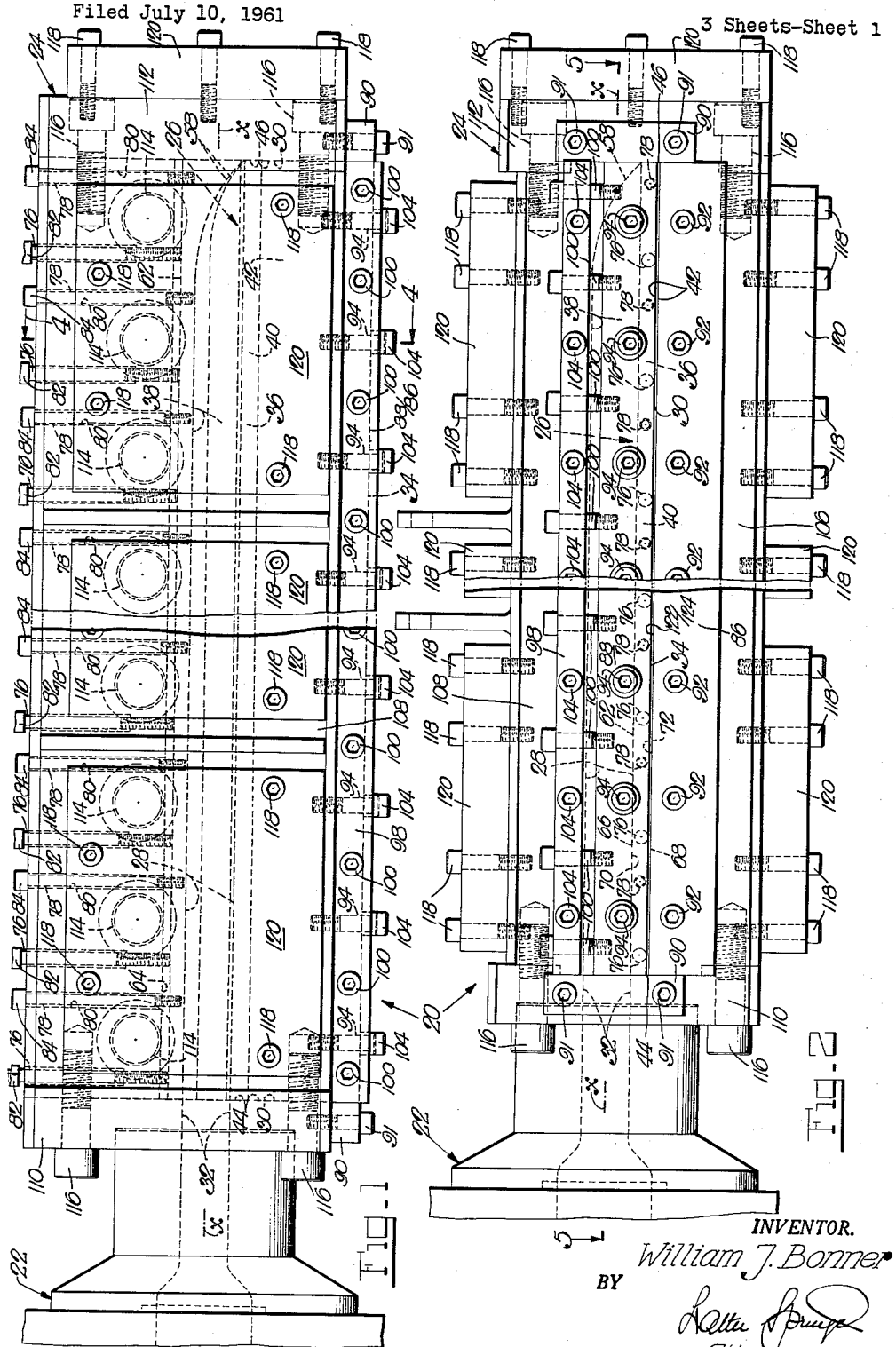

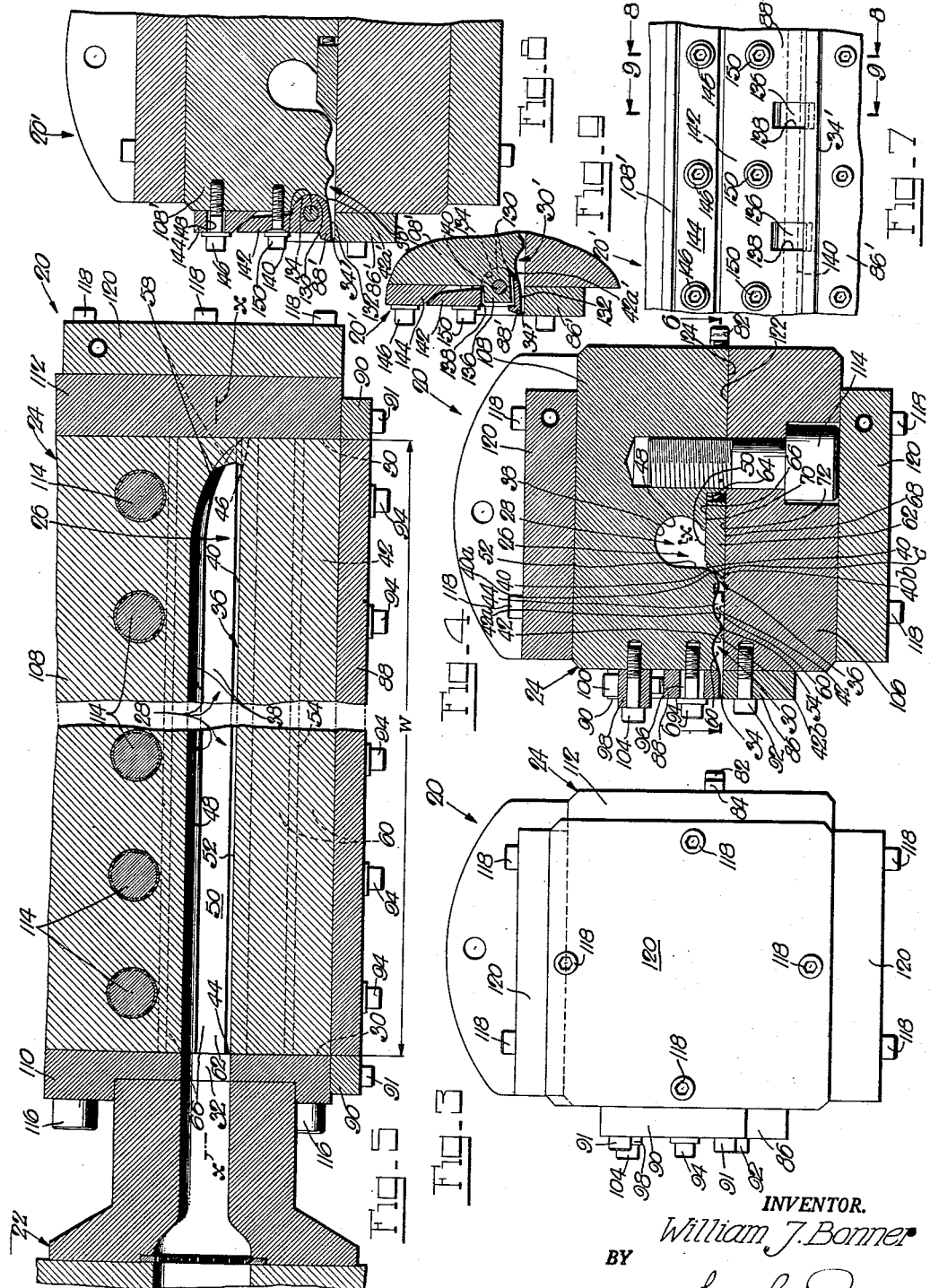

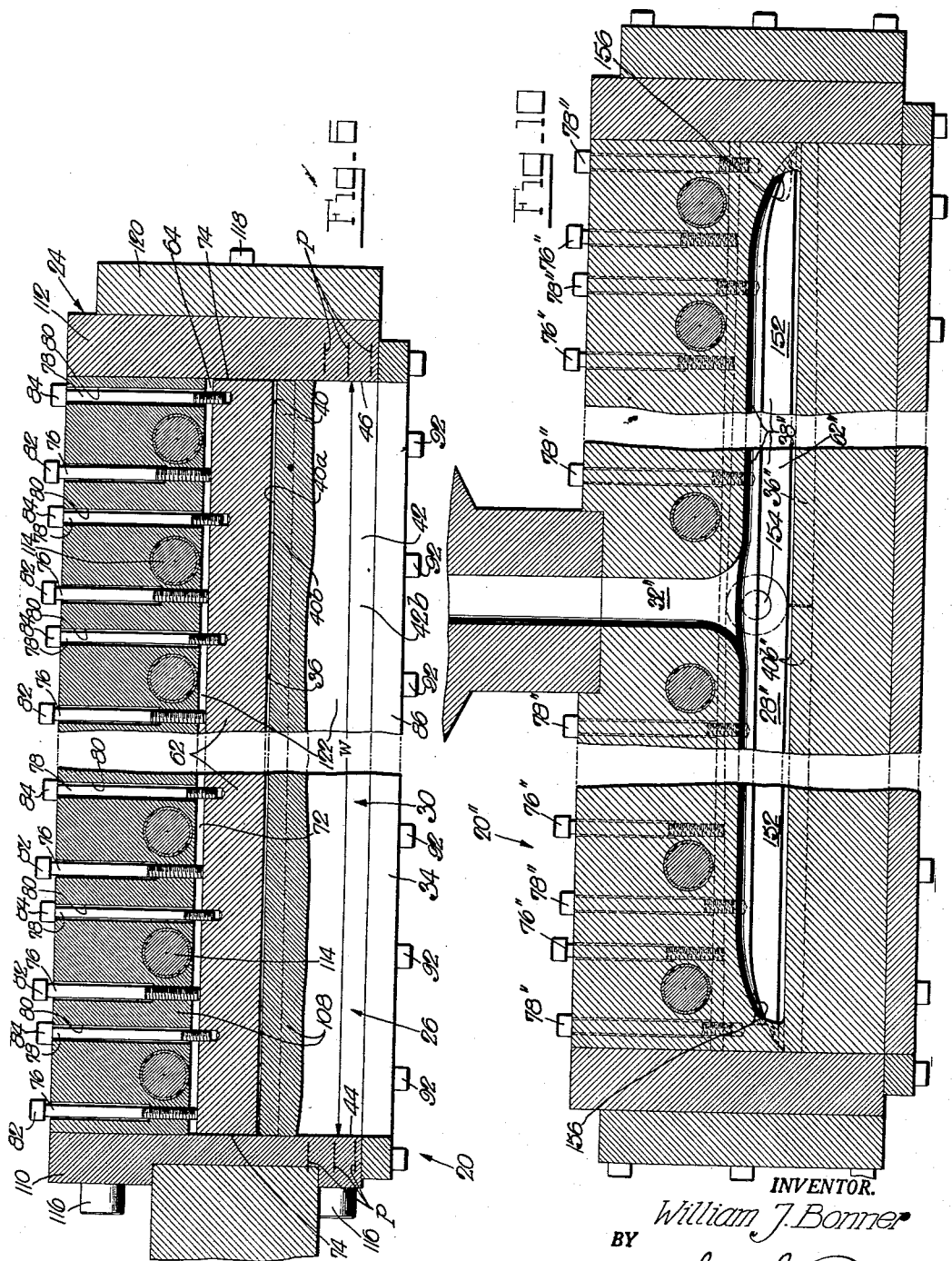

3,118,179
SHEET EXTRUSION DIE
William J. Bonner, Ashaway, R.I., assignor, by mesne assignments, to Crompton & Knowles Corporation, Worcester, Mass., a corporation of Massachusetts
Filed July 10, 1961, Ser. No. 122,813
4 Claims. (Cl. 18—12)

This invention relates generally to plastic extrusion dies, and more particularly to dies for extrusion of plastic in sheet form.

It is among the most important requirements of sheet extrusion dies that the admitted stock from the discharge end of an extruder is evenly distributed throughout the die passage and delivered to the sheet-forming die lips at a uniform volumetric flow rate throughout in order to obtain plastic sheeting of fairly uniform thickness in the first place, and the die passage must be devoid of any pocket-like formations in which plastic stock might hang up and burn and, in consequence, compel interruption of an extrusion operation in order to clean the die. While there are prior dies which meet the requirement of stock delivery to the die lips at a uniform volumetric flow rate for the formation of plastic sheeting of fairly uniform thickness, there are no dies which may be adjusted for varying the thickness of extruded plastic sheeting and are devoid of plastic-entrapping pockets. Hence, prior adjustable dies of this type either require cleaning whenever entrapped stock in the pockets therein burns and endangers a going extrusion operation, or they are utterly useless for the extrusion of plastics, such as vinyl plastics, for instance, which burn on even the slightest hang-up in a die.

The kind of die with which the present invention is concerned has its stock passage so arranged that the admitted stock under pressure will in a first path be directed over the entire width of the sheet to be extruded, and will be laterally displaced from this first path through a constriction into a second flow path lengthwise of the sheet which leads to the sheet-forming die lips.

It is an object of the present invention to provide a sheet extrusion die of adjustable type for the formation of plastic sheeting of various thicknesses, with the flow passage through the die being devoid of any stock-entrapping pocket or pockets at any adjustment of the die, thereby to eliminate the previously inevitable cleaning of dies of this type and for the first time have available an adjustable die for extruding plastics which will burn on the slightest hang-up in a die.

It is another object of the present invention to provide a sheet extrusion die of this type in which the aforementioned constriction is in the form of an adjustable flow-obstructing gap to meter stock into the succeeding final flow path at a substantially uniform volumetric flow rate throughout the same on mere linear variation of the width of this gap, and more particularly linear increase of its width from the stock admission end of the first flow path to the opposite end thereof, without leaving any stock-trapping pocket anywhere in the flow passage through the die at any adjustment of the flow-obstructing gap.

It is a further object of the present invention to provide a sheet extrusion die of this type in which the width of the aforementioned flow-obstructing gap may in its linear variation over the length of the first flow path be readily adjusted from the outside, even during an extrusion operation, without leaving any stock-entrapping pocket anywhere in the stock passage through the die.

Another object of the present invention is to provide a sheet extrusion die of this type in which the width of the aforementioned flow-obstructing gap may be adjusted not only in its linear variation, as aforementioned, but also throughout the gap, thereby to achieve the extrusion of a sheet of most any thickness, within limits, and of absolute uniformity in its thickness throughout.

Other objects and advantages will appear to those skilled in the art from the following, considered in conjunction with the accompanying drawings.

In the accompanying drawings, in which certain modes of carrying out the present invention are shown for illustrative purposes:

FIGS. 1 and 2 are fragmentary top and front views of a sheet extrusion die embodying the present invention;

FIG. 3 is an end view of the same die;

FIG. 4 is a cross-section through the die taken on the line 4—4 of FIG. 1;

FIG. 5 is a fragmentary longitudinal section through the die taken substantially on the line 5—5 of FIG. 2;

FIG. 6 is another fragmentary longitudinal section through the die taken substantially on the line 6—6 of FIG. 4;

FIG. 7 is a partial front view of a sheet extrusion die embodying the present invention in a modified manner;

FIGS. 8 and 9 are fragmentary sections taken on the lines 8—8 and 9—9, respectively, of FIG. 7; and FIG. 10 is a fragmentary longitudinal section through a sheet extrusion die embodying the present invention in a further modified manner.

Referring to the drawings, and more particularly to FIGS. 1 to 6 thereof, the reference numeral 20 designates a sheet extrusion die which is suitably mounted on the discharge end of an extruder 22. Provided in the body 24 of the die is a stock flow passage 26 having successive flow paths 28 and 30 with an inlet 32 and an outlet 34, respectively, and a constricted flow gap 36 intermediate and continuous with both flow paths 28 and 30 (FIGS. 4 to 6). The flow path 28 extends lengthwise over the width $w$ of a sheet to be extruded (FIGS. 5 and 6), while the flow gap 36 and the other flow path 30 extend lengthwise transversely of, and preferably at right angles to, the flow path 28 (FIGS. 1 and 5). The flow gap 36 leads laterally from the flow path 28 and is throughout its length of uniform width equal to and coextensive with the length of the flow path 28, and the other flow path 30 is lengthwise continuous with the flow gap 36 and of the same uniform width as the latter.

The flow path 28 is tubular about an axis $x$ and has a peripheral wall 38 between its ends of which one end is closed and the other end is open to the inlet 32. The flow gap 36 and flow path 30 have over their lengthwise and widthwise extent opposite walls 40 and 42, respectively, which are continuous with each other and with the peripheral wall 38 of the tubular flow path 28 (FIGS. 4 to 6). The flow gap 36 and flow path 30 have also opposite side walls 44 and 46. The tubular flow path 28 is, in the present instance, of uniform cross-sectional shape and size substantially throughout (FIG. 4), and its peripheral wall 38 has a curved, and preferably part-circular, wall part 48 and tangentially continuing wall parts 50 and 52 which converge wedge-like to the flow gap 36 (FIG. 4). The other flow path 30 leading to the outlet 34 is rectangular in each cross-sectional plane $p$ and may have one or more constrictions 54 (FIGS. 4 and 5), as a customary arrangement in the extrusion of a sheet of uniform thickness. Accordingly, it is a requirement of the constricted flow gap 36 to deliver stock to the flow path 30 at a uniform volumetric flow rate throughout in order that a sheet being extruded is assuredly of uniform thickness. This is accomplished by varying the constriction of the flow gap 36 over its width, and in this instance by linearly widening its constriction from the inlet end to the opposite closed end of the tubular flow path 28 (FIGS. 5 and 6). One of the gap walls 40, namely the wall 40a thereof (FIG. 4), is in this instance smoothly curved over its lengthwise extent and continuous with the tangential wall part 52 of the tubular flow path 28 and also with the wall 42a of the other flow path 30, while the other gap wall 40b is plane and continuous with the other tangential wall part 50 of the tubular flow path 28 and also with the wall 42b of the other flow path 30, so that the flow gap 36 has its operative constriction c intermediate its length and the part of the flow gap leading from the tubular flow path 28 approaches the constriction c wedge-like in continuation of the wedge-like approach of the tubular path to the flow gap (FIG. 4). The constriction c in the flow gap 36 is linearly widened from the inlet end to the opposite closed end of the tubular flow path 28 by simply inclining the gap walls 40 to each other throughout their widthwise extent (FIG. 6).

The constriction of the flow gap 36 is, in comparison to the cross-sectional area of the tubular flow path 28, so narrow as to compel admitted stock in this tubular path to flow throughout its axial length and continuously displace stock therefrom into the flow gap 36 throughout its width, thereby meeting one of the basic requirements to prevent unduly prolonged dwelling, and hence burning, of any part of the stock in the tubular flow path. The described part-circular and part-tangential cross-sectional shape of the tubular flow path 28 is further conducive to optimum motion of the admitted stock therein in all directions, including axially thereof as well as into the flow gap 36. To this end also, the peripheral wall 38 of the tubular flow path 28 is near its closed end preferably arranged gradually to approach, and at its closed end lead into, the flow gap 36 in the manner indicated at 58 in FIGS. 1, 2 and 5, though the flow path 28 is in any event of uniform cross-sectional shape and size over the remaining and by far greater part of its length. Further conducive to most direct and least impeded stock flow into the flow gap 36 and therein to its operative constriction c is the wedge-like approach of the flow gap to its constriction in the first place, and its wedge-like approach to this constriction in continuation of the wedge-like approach of the tubular flow path 28 to the flow gap 36 in the second place. In thus arranging the tubular flow path 28 and flow gap 36 for optimum motion of the stock therein and therethrough, as described, they are also devoid of any pocket-like formations in which stock could hang up for any length of time, and in consequence, become burned, as will be readily understood.

It is, of course, by virtue of the tubular arrangement of the flow path 28 with its inlet 32 at one end and its uniform cross-sectional shape and size substantially throughout, that on mere linear variation of the constriction in the flow gap 36 stock is delivered to the final flow path 30 at a substantially volumetric flow rate throughout, as described. Hence, with the stock being delivered to the final flow path 30 at a volumetric flow rate which is already sufficiently uniform for immediate extrusion of a sheet of uniform thickness, this final flow path may be quite short, and is in this instance just long enough to provide in conventional manner successive relief sections 60 with the intermediate constriction 54 as an additional and preferred, but not at all imperative, provision for spreading the stock evenly throughout the width of this final flow path. Also, the relief sections 60 are preferably quite shallow so as to expedite the stock flow in the final path 30 to its outlet 34 from which the sheet is being extruded. However, the tubular flow path 28 (FIG. 4) is preferably of a cross-sectional size which on the one hand is sufficiently large to hold over any given period far more stock than is required for the extrusion over the same period of a sheet of a given thickness, and on the other hand is far too small to retain the same stock for a period during which its plasticity could be appreciably changed. It is for this reason that the volume of the tubular flow path 28 is so much greater than the volume of the final flow path 30. In thus sizing the tubular flow path 28, the pressure differential of the stock therein will remain quite uniform and will also be relatively small, thereby achieving an optimum condition for stock delivery from the flow gap 36 of linearly varying constriction to the final flow path 30 at a uniform volumetric flow rate throughout the latter.

To achieve optimum uniformity of the volumetric flow rate of stock delivered to the final flow path 30, the constriction c in the flow gap 36 is preferably adjustable in its linear variation throughout the width of the gap. To this end, one of the gap walls 40, in this instance the exemplary plane gap wall 40b is formed by a side surface of a longitudinal bar 62 which is adjustable in the die body 24, and more particularly in a recess 64 therein (FIGS. 4 and 6). The bar 62 also has opposite plane parallel faces 66 and 68, of which part of the face 66 forms the plane tangential part 50 of the peripheral wall 38 of the tubular flow path 28 (FIG. 4), while the remainder of the face 66 and the entire face 68 are located on opposite plane parallel walls 70 and 72, respectively, of the recess 64, with the recess wall 72 being continuous and coextensive with the wall 42b of the final flow path 30. It is thus a characteristic of the flow gap 36 that the same extends from the plane of the wall part 50 of the tubular flow path 28 to the side thereof away from the axis x (FIG. 4). In retrospect, the recess 64 is formed so as to be with its walls 70 and 72 continuous and coextensive with the plane tangential wall part 50 of the tubular flow path 28 and the wall 42b of the final flow path 30, respectively, and the wall 42b is at least over part of its lengthwise extent from the recess wall 72 plane and parallel to the plane wall part 50 of the tubular flow path 28, though the wall 40b is in this instance plane throughout and parallel to the wall part 50. The bar 62 is for its adjustability substantially fittingly received and slidable in the recess 64 which is of a width equal to and coextensive with that of the gap 36 (FIGS. 4 and 6). With this arrangement, the described continuity of the gap walls 40 with the walls 42 of the final flow path 30 and with the peripheral wall 38 of the tubular flow path 28 is preserved at any adjustment of the bar 62 in the recess 64. Furthermore, the side surface 40b of the bar 62 is inclined to its opposite faces 66 and 68 in the manner shown in FIG. 4, wherefore the flow gap 36 extends lengthwise at a similar inclination from the tubular flow path 28 to the final flow path 30 for minimum directional change in the stock flow from the former to the latter, and, hence, without any abrupt bend in the stock flow direction thereat. Also, the opposite ends 74 of the bar 62 have some clearance from the adjacent end walls 44 and 46 of the recess 64 (FIG. 6) to permit adjustment of the bar with its side surface 46b into different operative inclinations to the opposite gap wall 40a, but this clearance is so slight as to preclude any stock-entrapping pocket formation thereat. Moreover, while the adjustability of the bar 62 in this fashion is of primary importance in the extrusion of a sheet of uniform thickness throughout, it is also advantageous for the extrusion of a sheet of a given linear variation in its thickness throughout its width as long as the final flow path is cross-sectionally shaped accordingly.

The bar 62 is in its recess 64 adjustable preferably from the outside of the die body 24 so that its side surface 40b may in its inclination to the opposite gap wall 40a be set quickly and with the utmost accuracy for stock delivery into the final flow path 30 at a volumetric flow rate of optimum uniformity throughout on merely adjusting the bar during a trial extrusion of a sheet from the die until the sheet is of optimum uniformity in its thickness throughout. To this end, there are provided in this instance push and pull screws 76 and 78 (FIGS. 1, 2 and 6), of which the push screws 76 are threadedly received in the die body 24 and bear with their ends against the bar 62, while the pull screws 78 extend through holes 80 in the die body 24 to, and are threadedly received in, the bar 62, with the pull screws 78 having adequate clearance in their respective holes 80 to swing with the bar 62 into any adjusted inclination of the latter to the gap wall 40a. The bar 62 may thus be adjusted on merely turning the screws 76 and 78 at their respective heads 82 and 84 on the outside of the die body 24, as will be readily understood. Of course, the screws 76 and 78 lend themselves as readily to adjustment of the bar 62 for the extrusion of sheets of different thicknesses, and to this end the outlet end 34 of the final flow path 30 may be adjustable in conventional manner.

For adjustability of the outlet end 34 of the final flow path 30 for the extrusion of sheets of different thicknesses, there are in this instance provided separate companion die lips 86 and 88 (FIGS. 1, 2 and 4) the confronting surfaces of which define the outlet 34 widthwise and in continuation of the final flow path in the die body, and the side bars 90 which close the outlet 34 on its opposite sides and are bolted at 91 to the die body. The lip 86 is fixed in position on the die body 24 and bolted thereto at 92, while the other lip 88 is adjustable to and from the lip 86 and locked in any adjusted position on the die body 24 by bolts 94 which pass through elongated holes 96 in the lip 88 and are threadedly received in the die body. With the die being in this instance arranged for customary extrusion of a sheet substantially horizontally, and with the exemplary die being of relatively large size for the extrusion of a sheet of correspondingly large width, the upper lip 88 is for its convenient and accurate adjustment on the die body 24 preferably suspended from an upper rail 98 through intermediation of bolts 100 which rest with their heads on the rail 98 and are threadedly received by the lip 88, with the rail 98 being bolted at 104 to the die body. Thus, on loosening the lock bolts 94, the upper lip 88 may be adjusted accurately and without effort by merely turning the bolts 100 at their heads, with the bolts 100 holding the lip 88 in its adjusted position until the lock bolts 94 are retightened.

The die body 24 is, in the present instance, formed by two complemental longitudinal sections 106 and 108 and opposite end members 110 and 112, of which the body sections are releasably secured to each other by bolts 114 while the end members are releasably secured to the body sections by bolts 116. The end member 110 provides the inlet 32 to the tubular flow path 28, and both end members 110 and 112 provide the opposite side walls 44 and 46, respectively, of the flow gap 36 and final flow path 30 (FIGS. 5 and 6). The body sections 106 and 108 provide the other walls 38, 42 and 40 of the flow paths 28, 30 and the flow gap 36, respectively, as well as the recess 64 for the reception of the bar 62. Secured by screws 118 to the body sections 106, 108 and to the end member 112 are conventional heater elements 120 for keeping the die at proper temperature.

The body sections 106 and 108 have plane parting surfaces 122 and 124, respectively, of which the surface 122 of the lower section 106 advantageously forms the wall 42b of the final flow path 30 and continuing wall 72 of the recess 64 (FIGS. 4 and 6). With this arrangement, the die may quickly be opened for ready access to the flow passage 26 to clean it on rare, if any, occasions of burnt stock, on merely removing the end member 112 from the die sections 106, 108 and the latter from the other end member 110, and then separating the die sections after first removing the heater elements 120 from the lower section 106 for access to the bolts 114. More important, however, is the fact that this arrangement of the die sections 106, 108 greatly facilitates the machining of the stock flow passage 26 in the die and, hence, makes for exceedingly low cost of the die. Thus, the parting surface 122 of the lower die section 106 need merely be planed and preferably ground for its conformation to the flow passage 26 and recess 64, while relatively simple machining of the upper die section 108 in various possible ways will provide the remainder of the flow passage 26 and recess 64. Insofar as machining of the upper die section 108 to this end is concerned, its parting surface 124 may initially be planed, and its tubular flow path 28 may initially be formed by boring a hole of the diameter of its circular wall part 48 (FIG. 4) about the marked axis x to a depth at which the peripheral wall of this path is to begin its gradual approach to the flow gap to be formed (FIG. 5), whereupon the formation of the flow passage 26 and recess 64 in this die section may be completed mostly by simple milling and shaping operations throughout the length of the die section.

The advantages of the present die in point of simplicity of construction, low cost and accurate and reliable performance have already been amply described and, hence, need not be repeated. However, in order to demonstrate the remarkable accuracy of performance of the present die, it is pointed out that an actual die of this type of exactly three times the size of that shown and of a width of 36" at its discharge lips produced sheets from even readily burnable vinyl plastics of most any lengths and of different thicknesses, with the tolerances in thickness being in all cases, and even at an exceedingly small sheet thickness of .008", a mere plus or minus 1%. These data are given by way of example only, since additional tests have already indicated that the present die lends itself to the extrusion of sheets of much larger widths and still smaller thicknesses of film dimensions at the same close tolerances in thickness.

While in the described die 20 adjustment beyond a relatively narrow range of the upper die lip 88 from its adjusted position in FIG. 4 in either direction, and particularly closer toward the lower die lip 86, will create an effective pocket between it and the adjacent end of the wall 42a of the adjacent flow path in which stock may be trapped at least temporarily, the upper die lip 88' in the die 20' of FIGS. 7 to 9 may be adjusted toward and away from the lower die lip 86' to the maximum extent without creating a pocket. To this end, the die lip 88' has in its rear and over the widthwise extent of the outlet 34' a roller-like formation 130 from which the sheet-forming surface 132 leads tangentially and which is received for limited turning movement in a part-cylindrical socket formation 134 in the upper die section 108', with the wall 42a' of the adjacent flow path 30' leading, or at least sufficiently nearly tangentially, to the roller formation 130 on the die lip 88' in any angularly adjusted position of the latter to preclude any pocket formation thereat. The upper die section 108' is also provided with spaced lug formations 136 which extend into recesses 138 in the die lip 88' and carry a shaft 140 on which the die lip is hinged over the widthwise extent of the outlet 34' for its secure retention in the socket formation 134 under the pressure of stock being extruded. The recesses 138 in the die lip 88' are sufficiently spaced from the sheet-forming surface 132 thereof fully to register with the socket formation 134 in any adjusted lip position, wherefore these recesses are inaccessible to the stock. For its adjustment, the die lip 88' has a wing-like formation 142 which extends to a wedge bar 144 that is adjustably mounted on the die section 108' by bolts 146 which extend through elongated holes 148 in the wedge bar. The die lip 88' is in any adjusted position locked to the wedge bar 144 by bolts 150 which are threadedly received in the die section 108'.

While in the described die 20 of FIGS. 1 to 6 stock is admitted into the tubular flow path 28 advantageously through one end thereof for the extrusion of sheets of most any width up to relatively large widths, FIG. 10 shows a die 20" which is advantageous for the extrusion of sheets of exceptionally large widths. The die 20" is in all essential respects like the die 20, except that the inlet 32" leads laterally into the tubular flow path 28" midway thereof, and the bar 62" is formed of two identical and individually adjustable sections 152 which are preferably hinged together at 154 for limited relative rotation, with the hinge connection 154 being such as to avoid any pocket thereat. The bar sections 152 may by the push and pull screws 76" and 78" be individually adjusted so that they extend with their respective walls 40b" of the flow gap 36" at the proper inclination to the confronting opposite gap wall, with the constriction in the flow gap 36" being narrowest midway of the tubular flow path 28" and becoming gradually wider to each end of the latter. Also, since the stock inlet 32" leads into the tubular flow path 28" midway thereof, the opposite ends of this flow path are closed and opposite endlengths 156 of its peripheral wall 38" gradually approach and lead into the flow gap 36" at the opposite ends of the tubular flow path.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a plastic sheet extrusion die, having a body with a stock passage therethrough formed as an initial tubular flow path with a longitudinal axis and an inlet, a final flow path transverse to said axis and a constricted flow gap leading laterally from said initial path lengthwise to said final path and being continuous and widthwise coextensive with the latter, with said final path having a first surface of which a length extending to said flow gap lies in a plane parallel to said axis and spaced from said initial path, and said flow gap extending across said space and having over its width a straight surface continuous and forming an obtuse angle with said length of said first surface, that improvement which comprises a formation in said body defining therein a groove lengthwise coextensive with the width of said flow gap and open to the latter, with said groove having opposite parallel side surfaces one of which is coplanar and continuous with said length of said first surface; a bar fittingly received in said groove for lateral sliding movement therein and having opposite parallel faces of which one rests on said one groove surface and the other projects beyond said groove to define part of said initial path, and a side face forming said flow gap surface; and means for adjusting said bar in said groove to vary the constriction of said flow gap.

2. The improvement in a plastic sheet extrusion die as set forth in claim 1, in which said bar has also freedom for slight turning movement in said groove, and said adjusting means is operable to vary the constriction of said flow gap uniformly or non-uniformly throughout.

3. The improvement in a plastic sheet extrusion die as set forth in claim 1, in which said side face of said bar is plane.

4. The improvement in a plastic sheet extrusion die as set forth in claim 1, in which said body is formed in two complemental sections releasably clamped to each other and having plane parting surfaces of which that of one of said sections forms said first surface of said final path and said one side surface of said groove.

References Cited in the file of this patent

UNITED STATES PATENTS

| | | |
|---|---|---|
| 2,479,804 | Bailey et al. | Aug. 23, 1949 |
| 2,709,834 | Johnson | June 7, 1955 |
| 2,788,543 | Dinsch | Apr. 16, 1957 |
| 2,813,301 | Underwood | Nov. 19, 1957 |
| 2,824,337 | Covington et al. | Feb. 25, 1958 |
| 3,057,010 | Reifenhauser | Oct. 19, 1962 |

FOREIGN PATENTS

| | | |
|---|---|---|
| 759,276 | Great Britain | Oct. 17, 1956 |